United States Patent [19]

Sudau et al.

[11] Patent Number: 5,836,216
[45] Date of Patent: Nov. 17, 1998

[54] FLYWHEEL OR INERTIAL MASS DEVICE FOR A MOTOR VEHICLE, THE FLYWHEEL HAVING INDENTATIONS AS TOOTHING OF A PLANETARY GEAR TRAIN

[75] Inventors: Jörg Sudau, Niederwerrn; Bernhard Schierling, Kürnach; Hilmar Göbel, Grafenrheinfeld, all of Germany

[73] Assignee: Fichtel & Sachs AG, Schweinfurt, Germany

[21] Appl. No.: 812,589

[22] Filed: Mar. 7, 1997

[30] Foreign Application Priority Data

Mar. 8, 1996 [DE] Germany ................. 196 09 043.1

[51] Int. Cl.[6] ...................................... F16F 15/30
[52] U.S. Cl. ........................ 74/574; 74/432; 464/68
[58] Field of Search ........................... 74/572, 573 R, 74/574, 432; 464/68, 24; 475/331

[56] References Cited

U.S. PATENT DOCUMENTS

| | | | |
|---|---|---|---|
| 2,857,777 | 10/1958 | Porter | 74/432 |
| 4,084,810 | 4/1978 | Forsman | 74/572 X |
| 4,346,624 | 8/1982 | Nagasaki et al. | 475/331 X |
| 4,611,701 | 9/1986 | Friedmann . | |
| 4,676,121 | 6/1987 | Kouno | 74/574 |
| 4,844,225 | 7/1989 | Fukushima . | |
| 5,048,658 | 9/1991 | Reik | 74/574 X |
| 5,127,286 | 7/1992 | Wittig | 74/573 R X |
| 5,355,747 | 10/1994 | Kajitani et al. | 74/574 X |
| 5,363,714 | 11/1994 | Hoguchi | 74/432 |
| 5,536,208 | 7/1996 | Krumm | 464/68 |
| 5,551,928 | 9/1996 | Sudau | 74/574 X |
| 5,570,615 | 11/1996 | Westphal et al. . | |

FOREIGN PATENT DOCUMENTS

| | | |
|---|---|---|
| 3411092 | 5/1985 | Germany . |
| 4444196 | 6/1995 | Germany . |
| 4425570 | 1/1996 | Germany . |
| 2158189 | 11/1985 | United Kingdom . |
| 2175067 | 11/1986 | United Kingdom . |
| 2285109 | 6/1995 | United Kingdom . |
| 2296072 | 6/1996 | United Kingdom . |
| 2297820 | 8/1996 | United Kingdom . |

*Primary Examiner*—Charles A. Marmor
*Assistant Examiner*—Scott Lund
*Attorney, Agent, or Firm*—Nils H. Ljungman and Associates

[57] ABSTRACT

An inertial mass device is realized with at least two inertial masses which can rotate relative to one another, one of which is connected to a hub disc which is effectively connected to elastic elements of a damping device and preferably with its radially inner area forms a hub for the location of a bearing arrangement. Corresponding to the hub disc there is at least one planet wheel of a planetary gear train which acts between the inertial masses. The hub disc, on its side facing away from the planet wheel, on a specified radius around its axis of rotation, has indentations formed in the peripheral direction at specified intervals, each of which indentations forms a projection toward the planet wheel on the opposite side of the hub disc, whereby the projections form a toothing on the hub disc, by means of which the hub disc is engaged with the toothing of the planet wheel for the transmission of a torque between the inertial masses.

17 Claims, 2 Drawing Sheets

Fig.1

FLYWHEEL OR INERTIAL MASS DEVICE FOR A MOTOR VEHICLE, THE FLYWHEEL HAVING INDENTATIONS AS TOOTHING OF A PLANETARY GEAR TRAIN

BACKGROUND OF THE INVENTION

1. Field of the Invention

This invention relates to an inertial mass device which has at least two inertial masses which can rotate one with respect to the other. One of the at least two inertial masses is connected to a hub disc which is effectively connected to elastic elements of a damping device. Preferably, the inertial mass which is connected to the hub disc forms a hub for the location of a bearing arrangement in its radially inner area.

2. Background Information

German Patent No. 44 25 570 A1 describes a known inertial mass device which has two inertial masses which can rotate relative to one another. The input-side inertial mass of the inertial mass device, by means of a bearing arrangement, carries a hub disc. The hub disc is non-detachably connected to the output-side inertial mass on one hand, and on the other hand is provided for the actuation of elastic elements of a damping device, which elements are active in the peripheral direction.

In contrast to a solid flywheel, the two inertial masses of such an inertial mass device are relatively lightweight. As the two masses are relatively lightweight, the large primary-side mass, which is composed of the drive and the drive-side inertial mass, is counteracted by only a small, output-side inertial mass which is supported on the transmission side. Consequently, the moment of resistance for a drive, whereby the moment of resistance is determined by the inertia of the drive side and a moment of reaction resulting from the action of the elastic elements, the friction and the inertia of the output-side inertial mass is relatively small. As the moment of resistance is relatively small, it is difficult to smooth out fluctuations in synchronization of the drive system.

The fluctuations in synchronization create torque fluctuations at the engine interface, to which interface secondary units, such as a generator, are connected. The fluctuations in torque can cause damage to these secondary units.

To solve such problems involving the inertial mass device, German Patent No. 44 44 196 A1 discloses a planetary gear train, by means of which an input-side inertial mass is effectively connected to the output-side gear train. This inertial mass device, however, does not have a hub disc in the sense described above. Rather, the actuation elements for elastic elements of a damping device which act in the peripheral direction are on one hand planet carriers which are provided for the location of at least one planet wheel, and on the other hand a ring gear which is engaged with the planet wheel. The introduction of the torque takes place by means of a sun wheel which is non-detachably connected to the input-side inertial mass to the planet wheel, and from the planet wheel both to the ring gear and to the planetary pinion carriers which are fastened to the output-side inertial mass. Also non-detachably fastened to the output-side inertial mass is a bearing flange (see also FIG. 3), which with its radially inner end axially fixes in position the output-side inertial mass in relation to a bearing arrangement which, for its part, is in turn non-detachably fastened to a hub of the input-side inertial mass.

In comparison to the inertial mass device described in the above-mentioned German Patent No. 44 25 570 A1, the inertial mass device described in German Patent No. 44 44 196 A1 is relatively complex and expensive, because instead of a hub disc which acts both as the actuator element for the elastic elements of the damping device and also for the bearing arrangement of the output-side inertial mass on the input-side inertial mass, there are two planetary gear carriers plus a bearing flange.

OBJECT OF THE INVENTION

The object of the invention is to realize an inertial mass device so that on one hand it has the advantages of a system which is realized with a planetary gear train between the inertial masses, but on the other hand makes do with a minimum number of components.

SUMMARY OF THE INVENTION

The invention teaches that this object can be accomplished by providing, corresponding to the hub disc, at least one planet wheel of a planetary gear train. The planetary gear wheel can be active between the inertial masses and the hub disc, and on its side facing away from the planet wheel, can have indentations at specified intervals from one another around the periphery, at a specified radius around the axis of rotation of the hub disc. Each of which indentations, on the side opposite the hub disc generates a projection which projects from a plane surface toward the planet wheel. The projections form a toothing on the hub disc, by means of which toothing the hub disc is engaged with the toothing of the planet wheel for the transmission of a torque or a rotational resistance between the inertial masses. In this manner, the hub disc itself can be part of the planetary gear train, whereby, depending on the embodiment, the hub disc can be realized either as the ring gear or as the sun wheel of the planetary gear train. It can be particularly advantageous if the hub disc acts as the ring gear, and when there are rotational displacements out of its neutral position, which displacements are caused by the elastic elements of the damping devices, the hub disc drives the planet wheel, which is designed to exert the greatest possible dynamic resistance to damp input-side torsional vibrations. For this purpose it is preferred that the toothing diameter, by means of which the planet wheel is engaged with the hub disc, should be particularly small, because a displacement of the hub disc thereby results in a high speed of rotation, and thus a high acceleration of the planet wheel. The mass moment of inertia of the planet wheel itself is also important for the achievement of a high dynamic resistance, whereby this planet wheel has the largest possible diameter or is provided with an accumulation of mass in the radially outer area. Both of these requirements can be met if the hub disc is engaged with the toothing of the planet wheel on a small diameter of the planet wheel, and the planet wheel, at an axial offset from this engagement, has a mass which is engaged radially far outwardly.

When the device claimed by the invention is configured in the manner described above, only the at least one planet wheel remains in the inertial mass device as the actual element of a planetary gear train, while the hub disc acts as the second element of the planetary gear train. As a result of the realization of the toothing of the hub disc with indentations which produce projections on the opposite side, it is also guaranteed that the hub disc will be able to perform its additional function as part of the planetary gear train with a minimal amount of manufacturing effort and expense, whereby essentially no cutting operations are necessary. It is sufficient, by applying a tool which has dies which are realized so that they correspond to the subsequent toothing, i.e. they are at a specified angular orientation in relation to one another and are at the required distance from one another, to displace material on the side of the planet wheel facing away from the hub disc, so that this material is pressed out in the form of a tooth on the side facing the planet wheel. Such an indentation can be created in various ways. In this case, an advantageous method involves a process of pressing the material to form the projection on the side opposite where it is being pressed. This pressing method can be used effectively whenever the height of the projection which functions as a tooth is less than the thickness of the material of the hub disc. Stated another way, it is a punching process wherein the punch does not pass through the material being formed into a projection but merely extends it to form the projection. This punching process extends the material of the hub disc as opposed to adding more material to the hub disc. The process can be looked at as merely reforming the hub disc to have a shape incorporating projections. Another way to describe the process is that it is a stamping process wherein the hub disc is stamped around the periphery to form a series of projections. In the punching method, a tool is applied to the reverse side of the hub disc, which tool has male dies in the manner of a punching tool, so that the indentations are practically stamped out, but only so far that on the forward side of the hub disc, i.e. on its side facing the planet wheel, there remains a minimal wall thickness of approximately 0.5 to approximately 1.5 mm, depending on the thickness of the hub disc. In the pressing method, a tooth space is formed on the reverse side of the tooth.

If the height of the tooth to be formed is greater than the thickness of the hub disc, a massive forming can be appropriate, in which the tooth is formed by applying high compression forces to the reverse side of the hub disc, so that the material flows into the tooth mold over the entire surface of the tooth. When the massive forming method is used, however, significant mechanical forces must be applied. The massive forming method is therefore most appropriately used on objects which are of low thickness, such as the planet wheel, which the invention also claims can be realized with indentations like the hub disc.

In one advantageous embodiment, the invention teaches that the bearing arrangement is axially secured between the two inertial masses.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The invention is illustrated in greater detail below with reference to the accompanying drawings, in which.

DESCRIPTION OF THE PREFERRED EMBODIMENT

Figure 1:
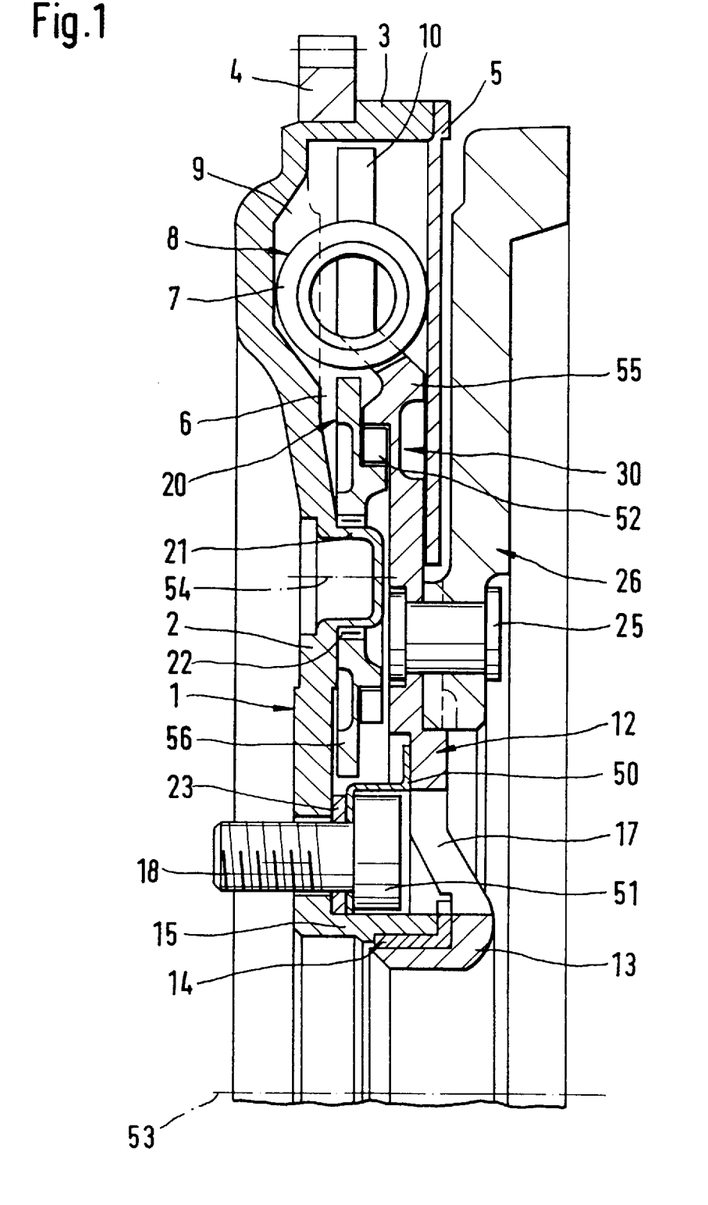
FIG. 1 is a longitudinal section through a one-half illustration of the inertial mass device with a hub disc acting as a ring gear and a planet wheel.

The inertial mass device illustrated in FIG. 1 has an input-side inertial mass 1 which is realized with a primary flange 2 which extends toward the radial outside, which primary flange 2, in the peripheral area, has an axial edge 3 on which a gear rim 4 is attached, and which gear rim 4 can be engaged with a starter pinion (not shown). Fastened to the axially free end of the axial edge 3 is a sealing plate 5 which projects radially inward. The sealing plate 5, together with the axial edge 3 and the primary flange 2, defines a grease chamber 6 in which are located elastic elements 7 of a damping device 8, which elastic elements 7 extend in the peripheral direction in the radially outer areas. The elastic elements 7 can be pressed on one end by actuator elements 9 against the primary flange 2, while on the other end they are supported on radially outwardly projecting fingers 10 of a hub disc 12 which, on its radially inner end, has a secondary hub 13 to hold a bearing arrangement 14. The bearing arrangement 14, for its part, supports a primary hub 15 of the primary flange 2. Viewed in the axial direction, the primary hub 15, beginning from the primary flange 2, extends toward the hub disc 12, while the secondary hub 13 extends from the hub disc 12 toward the primary flange 2. Such a hub shape can be created from the primary hub 15 and secondary hub 13 by deep drawing, for example.

The hub disc 12, which is connected to an output-side inertial mass 26 by means of rivets 25, is rotationally mounted on the input-side inertial mass 1 by means of the bearing arrangement 14. Radially immediately outside and tight up against the bearing arrangement 14, which in this case is formed by a friction bearing, the hub disc 12 is provided with an installation aperture 17, through which a fastening means 18 can be inserted. The fastening means 18, with its head 51, holds a seal 50, by means of which the grease chamber 6 can be sealed radially inwardly. By means of this seal 50, the head 51 of the fastening means 18 comes into contact against a spacer disc 23, which for its part is axially supported on the primary flange 2. By means of the fastening means 18, the inertial mass system can be fastened to a crankshaft (not shown) of an internal combustion engine.

The primary flange 2 has at least one bearing lug or extension 21 which projects toward the hub disc 12, on which bearing lug 21 a planet wheel 20 is rotationally mounted by means of a needle bearing 22. Viewed axially, the figure shows a first area which is active as the mass 56 and is radially as far as possible from the axis of rotation 54 of the planet wheel 20. On account of the mass 56, the moment of inertia of the planet wheel 20 is very high.

Figure 2:
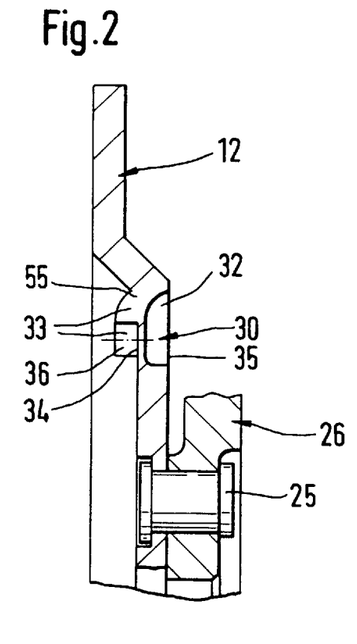
FIG. 2 is a detail of the hub disc illustrated in FIG. 1.
Figure 3:
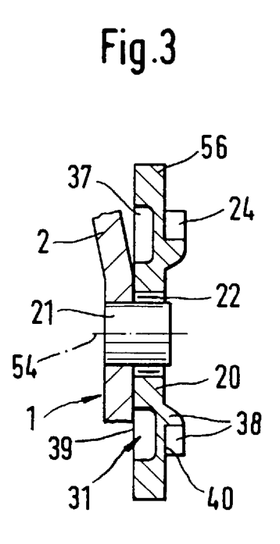
FIG. 3 is an illustration of the planet wheel illustrated in FIG. 1.

FIG. 2 depicts the hub disc in greater detail, and FIG. 3 depicts the planet gear in greater detail.

Axially adjacent the mass 56, the planet wheel 20 has a toothing 24 which is provided on a relatively small radius around the axis of rotation 54. The reason for the relatively small radius is that when the planet wheel 20 is driven by a toothing 36 which is realized in the form of a hub disc 12 which acts as the ring gear 55, movements of the hub disc 12 can be converted into high speeds of rotation on the planet wheel 20. For this purpose, a large moment of acceleration on the planet wheel 20 is necessary, which like the above-mentioned high moment of inertia results in a significant dynamic resistance which has a positive effect when torsional vibrations are introduced which originate from the internal combustion engine, because the torsional vibration can be effectively damped.

The following portion of the explanation goes into further detail about the toothing 24 of the planet wheel 20 and the toothing 36 of the hub disc 12. The hub disc 12, on its side facing away from the planet wheel 20, has indentations 30. When the hub disc 12 is viewed in the peripheral direction, a depression 32 is formed on the reverse side at the point at which the opposite side of the hub disc 12 is to have a projection 33 to form a tooth of the toothing 36. When the teeth 36 project beyond the hub disc 12 by a distance which is less than the thickness of the hub disc 12, these teeth 36 can preferably be created by means of the pressing method, whereby, beginning from the side of a plane surface 35 which is located on the side of the hub disc 12 facing away from the planet wheel 20, a tool is applied. The male dies of the tool are each realized in the form of a punching or stamping die, and by pushing in the direction of the hub disc 12 penetrate into the hub disc 12, to produce the indentations 30. However, the tool only pushes to the point where, depending on the thickness of the hub disc 12, a wall thickness of about 0.5 to about 1.5 mm of material remains on the side of the respective tooth 36 facing the planet wheel 20. At that point, the pressing process is terminated. For teeth which extend farther in the axial direction by an amount which is greater than the thickness of the hub disc 12, a massive forming is recommended, in which the male dies of the tool which is applied to the plane surface 35 of the hub disc 12 consist of solid material, and when a high compression force is applied, form the teeth as the material on the reverse side of the respective tooth flows into the tooth mold over the entire surface of the tooth. As a result, and as explained above, the indentations 30 are formed on the side facing away from the planet wheel 20, while on the side of the hub disc 12 facing the planet wheel 20 the toothing 36 is formed, so that, viewed in the peripheral direction, a plane surface 34 remains between each projection 33. The individual teeth of the toothing 36 are located at a specified distance from one another and on a specified radius around the axis of rotation 53 of the inertial mass device. As a result of this type of configuration of the hub disc 12, consequently, a ring gear is no longer necessary as a part of the planetary gear train 52, while the toothing 36 can be created without cutting, simply by pressing the teeth.

The toothing 24 of the planet wheel 20 which is engaged with the toothing 36 of the hub disc 12 can also be created by means of the pressing method or by massive forming, for which reason the planet wheel 20, on its side facing away from the hub disc 12, is also provided with indentations 31. Consequently, on this side there are depressions 37, between which depressions 37, viewed in the peripheral direction, a plane area 39 always remains. On the opposite side of the planet wheel 20, at the location of a depression 37, there is always a projection 38, while a plane area 40 always remains in the peripheral direction between each two projections 38. As a result of the alternating of the projections 38 with the plane surfaces 40, a toothing 24 is formed. The above-mentioned depressions 37 can also be produced by the application of a tool with stamping dies.

Figure 4:
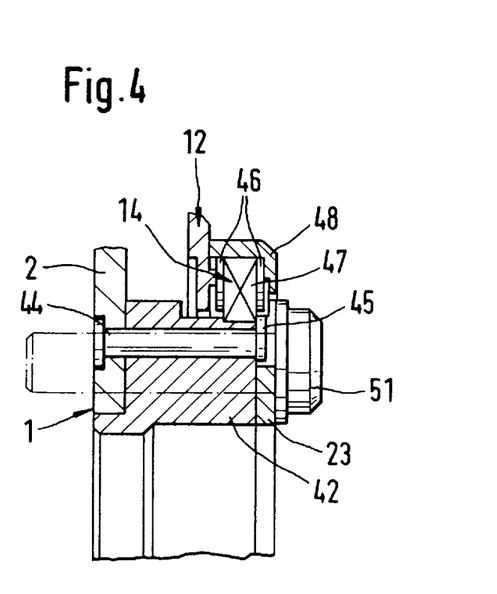
FIG. 4 illustrates a hub configuration of the inertial mass device which differs from the hub configuration illustrated in FIG. 1.

FIG. 4 illustrates a different type of hub 42 of the inertial mass device in which, viewed in the axial direction, on one hand the primary flange 2 of the inertial mass 1 and on the other hand the spacer disc 23 come into contact, by means of which the heads 51 of the fastening means 18 which are used to make the connection of the inertial mass device to the crankshaft of the internal combustion engine are supported. The primary flange 2 and the hub 42 are held together by axial rivets 44, the rivet heads 45 of which project in the radial direction beyond the rivets 44 and axially secure the inner ring of a bearing arrangement 14. The bearing arrangement 14 is realized in the form of a roller bearing 47, whereby the inner ring is supported on the other side on a radial projection of the hub 42. The outer ring of the roller bearing 47 is defined on both sides by sealing plates 46 which prevent the discharge of bearing grease and are secured axially by means of the hub disc 12 on one hand and a ring 48 which is fastened to the hub disc 12 on the other hand.

One feature of the invention resides broadly in the inertial mass device which has at least two inertial masses which can rotate relative to one another, one of which is connected to a hub disc which is effectively connected to elastic elements of a damping device and preferably with its radially inner area forms a hub for the location of a bearing arrangement, characterized by the fact that corresponding to the hub disc 12 there is at least one planet wheel 20 of a planetary gear train 52 which is active between the inertial masses 1, 26, and the hub disc 12, on its side facing away from the planet wheel 20, has indentations 30 at specified intervals from one another in the peripheral direction and at a specified radius around the axis of rotation 53 of the hub disc 12, each of which indentations 30, on the side opposite the hub disc 12 generates a projection 33 which projects from a plane surface 34 toward the planet wheel 20, whereby the projections 33 form a toothing 36 on the hub disc 12, by means of which toothing 36 the hub disc 12 is engaged with the toothing 24 of the planet wheel 20 for the transmission of a torque or a rotational resistance between the inertial masses 1, 26.

Another feature of the invention resides broadly in the inertial mass device characterized by the fact that the hub disc 12 is active as the ring gear 55 of the planetary gear train 52.

Yet another feature of the invention resides broadly in the inertial mass device characterized by the fact that the planet wheel 20, on its side facing away from the hub disc 12, has indentations 31 at a specified distance from one another in the peripheral direction and on a specified radius around its axis of rotation 54, each of which indentations 31, on the opposite side of the planet wheel 20, forms a projection 38 which projects with reference to a plane surface 40 toward the hub disc 12, whereby the projections 38 form the toothing 24 of the planet wheel 20.

Still another feature of the invention resides broadly in the inertial mass device characterized by the fact that a ring 48 is fastened to the radially inner area of the hub disc 12 to axially secure a bearing arrangement 14 which is located with its radial inside on a hub 42 of the other inertial mass 1, whereby the hub 42 is connected by means of rivets 44 with a primary flange 2 which runs radially outward, and the rivets 44 project with their heads 45 on the side of the hub 42 facing away from the primary flange 2 project into the bearing arrangement 14 to axially secure the bearing arrangement 14 in position.

A further feature of the invention resides broadly in the inertial mass device characterized by the fact that on the planet wheel 20 there is a mass 56 which projects radially beyond the toothing 24 of the planet wheel, which mass is guided with an axial offset with respect to the toothing 36 of the hub disc 12 which acts as the ring gear 55.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

The corresponding foreign patent publication applications, namely, Federal Republic of Germany Patent Application No. 196 09 043.1, filed on Mar. 8, 1996, having inventors Jörg Sudau, Bernhard Schierling, and Hilmar Göbel, and DE-OS 196 09 043.1 and DE-PS 196 09 043.1, are hereby incorporated by reference as if set forth in their entirety herein.

An example of a torsional vibration damper, and components associated therewith, which may be used with embodiments of the present invention may be found in the following U.S. Pat. No. 5,551,928, having the inventor Jörg Sudau entitled "Torsional Vibration Damper with Planetary Gearset"; which is hereby incorporated by reference as if set forth in its entirety herein.

U.S. patent application, Ser. No. 08/813,105, filed on or about Mar. 7, 1997, and claiming priority from Federal Republic of Germany Application No. 196 09 041.5, having Attorney Docket No. NHL-FIS-265, having the inventor Jörg Sudau, and claiming priority from DE-OS 196 09 041.5 and DE-PS 196 09 041.5, and having the title "Flywheel for a Motor Vehicle, the Flywheel Having a Torsional Vibration Damper", is hereby incorporated by reference as if set forth in its entirety herein.

U.S. patent application, Ser. No. 08/665,465, filed Jun. 18, 1996, and claiming priority from Federal Republic of Germany Application Number P 44 22 732.9 and P 43 43 802.4, and having Attorney Docket No. NHL-FIS-65-D, and having the title "Torsional Vibration Damper with a Planetary Gearset", having the inventor Jörg Sudau is hereby incorporated by reference as if set forth in its entirety herein.

U.S. patent application, Ser. No. 08/813,147, filed on or about Mar. 8, 1997, having the Attorney Docket No. NHL-FIS-273, claiming priority from Federal Republic of Germany Patent Application No. 196 20 698.7, filed on May 23, 1996; Federal Republic of Germany Patent Application No. 196 19 059.2, filed on May 13, 1996; and Federal Republic of Germany Patent Application No. 196 09 043.1, filed on March 8, 1996, having inventors Jörg Sudau, Bernhard Schierling, Hilmar Göbel, Jürgen Kleifges, and Cora Carlson is hereby incorporated by reference as if set forth in its entirety herein.

Although only a few exemplary embodiments of this invention have been described in detail above, those skilled in the art will readily appreciate-that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A two part flywheel for an internal combustion engine of a motor vehicle for transmitting mechanical rotary power from the internal combustion engine to a transmission, said flywheel comprising:

a first inertial mass;

a second inertial mass;

said first and second inertial masses being rotatable with respect to one another;

said second inertial mass comprising a hub disc;

said hub disc having an axis of rotation;

a planetary gear system for transmission of torque;

said planetary gear system consisting solely of:
 a planet wheel;
 a plurality of projections disposed on said hub disc;
 said plurality of projections being disposed a predetermined distance from said axis of rotation of said hub disc; and
 said plurality of projections being disposed to form a ring gear;

said planet wheel being rotatably connected to said first inertial mass;

said planet wheel being disposed to engage said projections of said hub disc to transmit torque between said first and second inertial masses;

said hub disc having a first side and a second side facing away from one another, both of said first and second sides being transverse to said axis of rotation;

said first side of said hub disc being disposed adjacent said planet wheel;

said plurality of projections being disposed on said first side of said hub disc;

said plurality of projections being disposed at predetermined circumferential distances from one another;

said hub disc comprising a plurality of indentations;

said plurality of indentations being disposed on said second side of said hub disc;

each of said plurality of indentations being disposed at a position corresponding to one of said plurality of projections on said first side of said hub disc; and said indentations and projections having been formed by at least one of pressing and stamping said second side of said hub disc toward said first inertial mass.

2. The two-part flywheel according to claim 1 wherein each of said plurality of projections comprises a tooth, each of said teeth being disposed to mesh with said planet wheel.

3. The two-part flywheel according to claim 2 wherein:

said plurality of projections is a first plurality of projections;

said plurality of indentations is a first plurality of indentations;

said planet wheel has an axis of rotation;

said axis of rotation of said planet wheel is substantially parallel to said axis of rotation of said hub disc;

said planet wheel has a first side and a second side facing away from one another, said first and second sides being transverse to said axis of rotation;

said first side of said planet wheel is disposed adjacent said first side of said hub disc;

said planet wheel comprises a second plurality of indentations;

said second plurality of indentations is disposed a predetermined distance from said axis of rotation of said planet wheel;

said second plurality of indentations is disposed on said second side of said planet wheel;

a second plurality of projections disposed on said first side of said planet wheel;

said plurality of projections being disposed at predetermined circumferential distances from one another; and each of said second plurality of indentations is disposed at a position corresponding to one of said second plurality of projections on said planet wheel.

4. The two-part flywheel according to claim 3 wherein each of said second plurality of projections comprises a tooth, each of said teeth being disposed to mesh with said teeth of said hub disc.

5. The two-part flywheel according to claim 4 wherein:

said planet wheel comprises a portion;

said portion is disposed adjacent said second plurality of indentations; and said portion extends from said second plurality of indentations radially outward from the axis of rotation of said planet wheel.

6. The two part flywheel according to claim 5 wherein:

said first inertial mass comprises:

a hub; and a primary flange;

said hub projecting from said first inertial mass toward said second inertial mass;

said hub disc being disposed about said hub;

said hub having an end, said end being disposed away from said primary flange;

a plurality of rivets, said plurality of rivets attaching said hub to said primary flange;

each of said plurality of rivets comprising a rivet head;

each rivet head of said plurality of rivets being disposed adjacent said end of said hub;

said two-part flywheel comprises:

a bearing arrangement;

said bearing arrangement being disposed adjacent said hub and said hub disc;

a ring;

said ring being attached to said hub disc;

said ring being disposed to secure said bearing arrangement against said hub and said hub disc; and each rivet head of said plurality of rivet heads being disposed adjacent said bearing arrangement to axially secure said bearing arrangement.

7. A two part flywheel for an internal combustion engine of a motor vehicle for transmitting mechanical rotary power from the internal combustion engine to a transmission, said flywheel comprising:

a first inertial mass;

a second inertial mass;

said first and second inertial masses being rotatable with respect to one another;

said second inertial mass comprising a hub disc;

said hub disc having an axis of rotation;

a planetary gear system for transmission of torque;

said planetary gear system comprising:

at least one planet wheel;

a plurality of projections disposed on said hub disc;

said plurality of projections being disposed a predetermined distance from said axis of rotation of said hub disc; and said plurality of projections being disposed to form a ring gear;

said at least one planet wheel being rotatably connected to said first inertial mass;

said at least one planet wheel being disposed to engage said projections of said hub disc to transmit torque between said first and second inertial masses;

said hub disc having a first side and a second side facing away from one another, both of said first and second sides being transverse to said axis of rotation;

said first side of said hub disc being disposed adjacent said at least one planet wheel;

said plurality of projections being disposed on said first side of said hub disc;

said plurality of projections being disposed at predetermined circumferential distances from one another;

said hub disc comprising a plurality of indentations;

said plurality of indentations being disposed on said second side of said hub disc;

each of said plurality of indentations being disposed at a position corresponding to one of said plurality of projections on said first side of said hub disc; and said indentations and projections having been formed by at least one of pressing and stamping said second side of said hub disc toward said first inertial mass.

8. The two-part flywheel according to claim 7 wherein each of said plurality of projections comprises a tooth, each of said teeth being disposed to mesh with said at least one planet wheel.

9. The two-part flywheel according to claim 8 wherein:

said plurality of projections is a first plurality of projections;

said plurality of indentations is a first plurality of indentations;

said at least one planet wheel has an axis of rotation;

said axis of rotation of said planet wheel is substantially parallel to said axis of rotation of said hub disc;

said at least one planet wheel has a first side and a second side facing away from one another, said first and second sides being transverse to said axis of rotation;

said first side of said at least one planet wheel is disposed adjacent said first side of said hub disc;

said at least one planet wheel comprises a second plurality of indentations;

said second plurality of indentations is disposed a predetermined distance from said axis of rotation of said at least one planet wheel;

said second plurality of indentations is disposed on said second side of said at least one planet wheel;

a second plurality of projections disposed on said first side of said at least one planet wheel;

said plurality of projections being disposed at predetermined circumferential distances from one another; and each of said second plurality of indentations is disposed at a position corresponding to one of said second plurality of projections on said at least one planet wheel.

10. The two-part flywheel according to claim 9 wherein each of said second plurality of projections comprises a tooth, each of said teeth being disposed to mesh with said teeth of said hub disc.

11. The two-part flywheel according to claim 10 wherein:

said at least one planet wheel comprises a portion;

said portion is disposed adjacent said second plurality of indentations; and said portion extends from said second plurality of indentations radially outward from the axis of rotation of said at least one planet wheel.

12. The two part flywheel according to claim 11 wherein:

said first inertial mass comprises:
- a hub; and
- a primary flange;

said hub projecting from said first inertial mass toward said second inertial mass;

said hub disc being disposed about said hub;

said hub having an end, said end being disposed away from said primary flange;

a plurality of rivets, said plurality of rivets attaching said hub to said primary flange;

each of said plurality of rivets comprising a rivet head;

each rivet head of said plurality of rivets being disposed adjacent said end of said hub;

said two-part flywheel comprises:
- a bearing arrangement;
  - said bearing arrangement being disposed adjacent said hub and said hub disc;
  - a ring;
  - said ring being attached to said hub disc;
  - said ring being disposed to secure said bearing arrangement against said hub and said hub disc; and
  - each rivet head of said plurality of rivet heads being disposed adjacent said bearing arrangement to axially secure said bearing arrangement.

13. A two part flywheel for an internal combustion engine of a motor vehicle for transmitting mechanical rotary power from the internal combustion engine to a transmission, said flywheel comprising:

a first inertial mass;

a second inertial mass;

said first and second inertial masses being rotatable with respect to one another;

said second inertial mass comprising a hub disc;

said hub disc having an axis of rotation;

a planetary gear system for transmission of torque;

said planetary gear system consisting solely of:
- a plurality of planet wheels;
- a plurality of projections disposed on said hub disc;
- said plurality of projections being disposed a predetermined distance from said axis of rotation of said hub disc; and
- said plurality of projections being disposed to form a ring gear;

said plurality of planet wheels being rotatable connected to said first inertial mass;

said plurality of planet wheels being disposed to engage said projections of said hub disc to transmit torque between said first and second inertial masses;

said hub disc having a first side and a second side facing away from one another, both of said first and second sides being transverse to said axis of rotation;

said first side of said hub disc being disposed adjacent said plurality of planet wheels;

said plurality of projections being disposed on said first side of said hub disc;

said plurality of projections being disposed at predetermined circumferential distances from one another;

said hub disc comprising a plurality of indentations;

said plurality of indentations being disposed on said second side of said hub disc;

each of said plurality of indentations being disposed at a position corresponding to one of said plurality of projections on said first side of said hub disc; and said indentations and projections having been formed by at least one of pressing and stamping said second side of said hub disc toward said first inertial mass.

14. The two-part flywheel according to claim 13 wherein each of said plurality of projections comprises a tooth, each of said teeth being disposed to mesh with said plurality of planet wheels.

15. The two-part flywheel according to claim 14 wherein:

said plurality of projections is a first plurality of projections;

said plurality of indentations is a first plurality of indentations;

each of said plurality of planet wheels has an axis of rotation;

said axis of rotation of each of said plurality of planet wheels is substantially parallel to said axis of rotation of said hub disc;

each of said plurality of planet wheels has a first side and a second side facing away from one another, said first and second sides being transverse to said axis of rotation;

said first side of each of said plurality of planet wheels is disposed adjacent said first side of said hub disc;

said plurality of planet wheels comprises a second plurality of indentations;

said second plurality of indentations is disposed a predetermined distance from said axis of rotation of each of said plurality of planet wheels;

said second plurality of indentations is disposed on said second side of each of said plurality of planet wheels;

a second plurality of projections disposed on said first side of each of said plurality of planet wheels;

said plurality of projections being disposed at predetermined circumferential distances from one another;

each of said second plurality of indentations is disposed at a position corresponding to one of said second plurality of projections on said plurality of planet wheels; and each of said second plurality of projections comprises a tooth, each of said teeth being disposed to mesh with said teeth of said hub disc.

16. The two-part flywheel according to claim 15 wherein:

each of said plurality of planet wheels comprises a portion;

said portion of each of said plurality of planet wheels is disposed adjacent said second plurality of indentations; and said portion of each of said plurality of planet wheels extends from said second plurality of indentations radially outward from the axis of rotation of the corresponding one of said plurality of planet wheels.

17. The two part flywheel according to claim 16 wherein:

said first inertial mass comprises:
- a hub; and
- a primary flange;

said hub projecting from said first inertial mass toward said second inertial mass;

said hub disc being disposed about said hub;

said hub having an end, said end being disposed away from said primary flange;

a plurality of rivets, said plurality of rivets attaching said hub to said primary flange;

each of said plurality of rivets comprising a rivet head;

each rivet head of said plurality of rivets being disposed adjacent said end of said hub;

said two-part flywheel comprises:
 a bearing arrangement;
  said bearing arrangement being disposed adjacent said hub and said hub disc;
 a ring;
  said ring being attached to said hub disc;
  said ring being disposed to secure said bearing arrangement against said hub and said hub disc; and
 each rivet head of said plurality of rivet heads being disposed adjacent said bearing arrangement to axially secure said bearing arrangement.

* * * * *

UNITED STATES PATENT AND TRADEMARK OFFICE
CERTIFICATE OF CORRECTION

PATENT NO.  : 5,836,216
DATED       : November 17, 1998
INVENTOR(S) : Jörg SUDAU, Bernhard SCHIERLING, and Hilmar GÖBEL It is certified that error appears in the above-identified patent and that said Letters Patent is hereby corrected as shown below:

In column 11, line 50, Claim 13, after 'being' delete "rotatable" and substitute therefor --rotatably--.

Signed and Sealed this

Sixth Day of July, 1999

Attest:

Q. TODD DICKINSON

*Attesting Officer*  *Acting Commissioner of Patents and Trademarks*